United States Patent
Chastain et al.

(10) Patent No.: US 9,688,487 B2
(45) Date of Patent: Jun. 27, 2017

(54) ADHESIVE BIN AND METHOD OF STORING AND MOVING ADHESIVE PARTICULATE TO AN ADHESIVE MELTER

(71) Applicant: Nordson Corporation, Westlake, OH (US)

(72) Inventors: Andrew Chastain, Sandy Springs, GA (US); Justin A. Clark, Suwanee, GA (US); Barrington Richards, Alpharetta, GA (US); Robert J. Woodlief, Suwanee, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 14/436,663

(22) PCT Filed: Mar. 25, 2014

(86) PCT No.: PCT/US2014/031648
§ 371 (c)(1),
(2) Date: Apr. 17, 2015

(87) PCT Pub. No.: WO2014/160667
PCT Pub. Date: Oct. 2, 2014

(65) Prior Publication Data
US 2016/0001988 A1    Jan. 7, 2016

Related U.S. Application Data

(60) Provisional application No. 61/806,205, filed on Mar. 28, 2013.

(51) Int. Cl.
*B65G 53/22* (2006.01)
*B65G 53/50* (2006.01)
(Continued)

(52) U.S. Cl.
CPC .............. *B65G 53/50* (2013.01); *B05C 11/10* (2013.01); *B05C 11/11* (2013.01); *B65G 37/00* (2013.01);
(Continued)

(58) Field of Classification Search
CPC ................................ B65D 88/72; B65G 53/22
(Continued)

(56) References Cited

U.S. PATENT DOCUMENTS 3,188,144 A * 6/1965 Gmur ..................... B65B 1/16
                                                        222/195
3,239,146 A    3/1966 Freda
(Continued)

FOREIGN PATENT DOCUMENTS

CN    101370630 A    2/2009
JP    2000198539 A    7/2000

OTHER PUBLICATIONS

Fluid-Air Products Inc., InvisiPac Powerpoint Presentation, Jan. 5, 2013, 12 pgs.
(Continued)

*Primary Examiner* — Joseph Dillon, Jr.
(74) *Attorney, Agent, or Firm* — Baker & Hostetler LLP

(57) ABSTRACT

An adhesive bin (10) for storing and moving adhesive particulate (14) to an adhesive melter (12) includes a supply hopper (16), a transfer pump (62) operable to generate a vacuum, and a shroud (94). The supply hopper (16) has a sidewall (20, 22, 24, 26) and defines an interior space (36). The transfer pump (62) extends through the sidewall (22) and into the interior space (36). In addition, the shroud (94) is connected to the sidewall (22) and extends into the interior space (36) and at least partially surrounds an inlet (82) of the transfer pump (62).

19 Claims, 4 Drawing Sheets

(51) Int. Cl.
  *B05C 11/10* (2006.01)
  *B05C 11/11* (2006.01)
  *F04B 37/14* (2006.01)
  *B65G 37/00* (2006.01)
  *B65G 53/28* (2006.01)

(52) U.S. Cl.
  CPC .............. *B65G 53/28* (2013.01); *F04B 37/14* (2013.01); *B05C 11/1042* (2013.01); *B05C 11/1047* (2013.01)

(58) Field of Classification Search
  USPC ....... 406/75, 92, 97, 98, 139, 140, 144, 151, 406/152, 153, 146; 366/163.2
  See application file for complete search history.

(56) References Cited

U.S. PATENT DOCUMENTS

| | | | | |
|---|---|---|---|---|
| 4,278,240 A * | 7/1981 | Archenholtz | ............ | F27D 3/18 266/216 |
| 4,305,210 A * | 12/1981 | Christensen | ............... | B01J 8/36 34/164 |
| 4,387,852 A * | 6/1983 | Mattson | ................. | A01C 15/04 222/630 |
| 4,411,388 A * | 10/1983 | Muck | .................... | B05B 7/1486 239/419.5 |
| 4,586,854 A * | 5/1986 | Newman | ............... | B05B 7/1404 137/888 |
| 4,615,649 A | 10/1986 | Sharpless | | |
| 4,815,414 A * | 3/1989 | Duffy | .................... | B05B 7/1477 118/308 |
| 4,900,200 A * | 2/1990 | Harumoto | ............. | B65G 53/26 406/106 |
| 4,919,308 A * | 4/1990 | Majkrzak | ............ | B05C 11/1042 126/343.5 A |
| 4,963,392 A * | 10/1990 | Molnar | ................... | B05B 7/145 118/308 |
| 5,161,473 A * | 11/1992 | Landphair | .............. | A01C 7/081 111/174 |
| 5,269,463 A * | 12/1993 | Burks | ..................... | B05B 7/205 239/654 |
| 5,378,089 A | 1/1995 | Law | | |
| 5,398,733 A * | 3/1995 | Welch | .................. | B67D 1/0021 137/3 |
| 5,690,450 A | 11/1997 | Miller et al. | | |
| 5,791,830 A * | 8/1998 | Fort | ...................... | B28B 13/021 406/151 |
| 5,971,207 A * | 10/1999 | McDonough | ......... | B05B 7/1445 222/1 |
| 6,036,408 A * | 3/2000 | Wilhelm | ............. | B65B 69/0075 406/113 |
| 6,039,513 A * | 3/2000 | Law | ....... | B65G 53/60 406/157 |
| 6,095,803 A * | 8/2000 | Slater | .................. | B05C 11/1042 222/146.2 |
| 6,398,462 B1 * | 6/2002 | Fulkerson | ............. | B05B 7/1404 406/134 |
| 6,454,496 B1 * | 9/2002 | Mills | ........................ | B60P 1/60 406/146 |
| 7,311,474 B1 * | 12/2007 | Ogasahara | ............. | B65G 53/26 406/143 |
| 8,307,859 B2 * | 11/2012 | Jordan | ................... | B01J 8/0015 141/369 |
| 8,936,416 B2 * | 1/2015 | Stutz, Jr. | ................. | B65G 53/40 222/400.5 |
| 9,266,681 B2 * | 2/2016 | Chau | .................... | B05C 11/1002 |
| 9,302,857 B2 * | 4/2016 | Clark | ..................... | B65G 53/10 |
| 9,308,547 B2 * | 4/2016 | Clark | .................. | B05C 11/1042 |
| 9,427,766 B2 | 8/2016 | Varga | | |
| 9,440,803 B1 * | 9/2016 | Martin | ................... | B65G 53/66 |
| 2002/0154956 A1 * | 10/2002 | Peveling | ................ | B65D 88/72 406/153 |
| 2008/0152437 A1 * | 6/2008 | Merritt | .................. | B05B 7/1472 406/39 |
| 2011/0142552 A1 * | 6/2011 | Lasko | ..................... | B05C 11/10 406/85 |
| 2013/0105526 A1 | 5/2013 | Ross et al. | | |
| 2013/0112312 A1 | 5/2013 | Ross et al. | | |
| 2013/0115016 A1 | 5/2013 | Ross et al. | | |
| 2013/0287503 A1 * | 10/2013 | Clark | ..................... | B65G 53/10 406/98 |
| 2014/0116569 A1 * | 5/2014 | Clark | .................. | B05C 11/1042 141/1 |
| 2015/0063925 A1 * | 3/2015 | Varga | ................... | B65G 53/56 406/1 |
| 2015/0298899 A1 * | 10/2015 | Ganzer | .................. | B65D 88/54 414/304 |
| 2015/0307271 A1 * | 10/2015 | Rey | ....................... | B05B 7/1445 414/304 |
| 2016/0175877 A1 * | 6/2016 | Clark | ..................... | B65G 53/10 427/207.1 |

OTHER PUBLICATIONS

U.S. Patent and Trademark Office, International Search Report and Written Opinion in PCT Application Serial No. PCT/US2014/031648, Aug. 20, 2014.

Chinese Application No. 201480015853.0: First Office Action dated Jul. 25, 2016, 12 pages.

EP Application No. 14 774 914, Partial European Search Report dated Feb. 16, 2016, 7 pages.

* cited by examiner

ADHESIVE BIN AND METHOD OF STORING AND MOVING ADHESIVE PARTICULATE TO AN ADHESIVE MELTER

CROSS-REFERENCE TO RELATED APPLICATION

This application claims the priority of U.S. Provisional Patent Application Ser. No. 61/806,205, filed on Mar. 28, 2013 (pending), the disclosure of which is incorporated by reference herein.

TECHNICAL FIELD

The present invention relates generally to an adhesive bin for an adhesive melter, and more particularly, to an adhesive bin and method for moving adhesive particulate with improved pumping efficiency to an adhesive melter.

BACKGROUND

Thermoplastic adhesives, otherwise known as "hot melt" adhesives, have been widely used in industry for various applications. For example, thermoplastic hot melt adhesives are used for carton sealing, case sealing, tray forming, pallet stabilization, nonwoven application including diaper manufacturing, and many other applications. Hot melt adhesive, in its pre-melted state (referred to herein as "particulate" hot melt adhesive), can be provided in a variety of particulate shapes and sizes, ranging from small bb-sized pieces, to larger sized pieces including pellets and chips. Adhesive material, in the form of adhesive particulate, may be supplied to the adhesive melter where it is heated and melted to a desired temperature for dispensing. Hot melt adhesives are often dispensed by systems including a dispensing gun coupled via heated hoses to an adhesive melter.

An adhesive bin may contain adhesive particulate for storage prior to melting in the adhesive melter. A transfer pump, such as a pneumatic pump, connects to the adhesive bin for moving the adhesive particulate via a hose from the adhesive bin to the adhesive melter. Pneumatic pumps generally rely on the suction of gas, such as air, entrained within gaps between individual pieces of adhesive particulate stored within the adhesive bin for moving the adhesive particulate. This gas may also be referred to as "make-up" gas. Traditionally, the adhesive particulate gravity feeds into a lower portion of the adhesive bin toward an inlet of the transfer pump and submerges a majority of the pump inlet. The transfer pump generates a vacuum at the inlet that withdraws the entrained make-up gas and adhesive particulate therein. In turn, the suction of the entrained make-up gas creates a vacuum within the gaps of the adhesive particulate that withdraws additional gas from a surrounding environment. The additional gas from the surrounding environment continuously replaces the entrained/make-up gas within the adhesive bin for moving the adhesive particulate with the transfer pump.

Larger sizes of adhesive particulate tend to form larger gaps of entrained make-up gas, while smaller sizes of adhesive particulate tend to form smaller gaps of entrained make-up gas. In this respect, the smaller sizes of adhesive particulate may more densely pack within the adhesive bin than the larger sizes of adhesive particulate. The increased density results in smaller gaps throughout the adhesive particulate for drawing entrained make-up gas from the surrounding environment. Additionally, it has been determined that if a vertical depth of the adhesive particulate above the inlet is increased, then the transfer pump expends additional energy withdrawing make-up gas through the adhesive particulate within the adhesive bin. Thus, increases in the vertical depth of densely packed adhesive particulate above the inlet reduce the efficiency of the transfer pump.

There is a need, therefore, for an adhesive bin and method for use with a transfer pump that addresses present challenges and characteristics such as those discussed above.

SUMMARY

An exemplary embodiment of an adhesive bin for storing and moving adhesive particulate includes a supply hopper, a transfer pump, and shroud. The supply hopper includes a sidewall and defines an interior space. The interior space is configured for storing adhesive particulate. The transfer pump includes a pump housing that defines an inlet. The transfer pump is operatively connected to the supply hopper such that the pump housing extends into the interior space of the supply hopper. The transfer pump is also operable to generate a vacuum at the inlet to actuate removal of the adhesive particulate from the supply hopper. In addition, the shroud is connected to the sidewall and extends into the interior space of the supply hopper. The shroud surrounds at least a portion of the inlet for maintaining a consistent minimized depth of the adhesive particulate located directly above the inlet within the supply hopper.

In one aspect, the shroud includes a plurality of connected panels. For example, the connected panels may partially or completely surround the pump housing around the inlet. In another aspect, the shroud extends from the sidewall around the pump housing such that the shroud, pump housing, and sidewall collectively define a gas space positioned within the interior space of the supply hopper. The gas space may entrain an additional amount of make-up gas proximate to the inlet when the interior space is filled with adhesive particulate. As a result of the consistent minimized depth of the adhesive particulate and the additional make-up gas proximate to the inlet, the transfer pump operates more efficiently in moving adhesive particulate to an adhesive melter because make-up gas is easier to draw into the pump inlet with the consistent minimized depth and the active addition of more gas located proximate to the pump inlet.

In another embodiment, an adhesive bin for storing and moving adhesive particulate includes a supply hopper, a transfer pump, a vibrator, and a gas conduit. The supply hopper includes a sidewall and defines an interior space. The interior space is configured for storing adhesive particulate. The transfer pump includes a pump housing that defines an inlet. The transfer pump is operatively connected to the supply hopper such that the pump housing extends into the interior space of the supply hopper. The transfer pump is also operable to generate a vacuum at the inlet to actuate removal of the adhesive particulate from the supply hopper. Additionally, the vibrator is configured to fluidly connect to a gas supply for actuating the vibrator, which is fluidly connected to the gas conduit. The gas conduit defines a gas outlet for receiving the gas supply from the vibrator. The gas outlet is positioned proximate to the inlet for exhausting the gas supply as make-up gas located around the adhesive particulate proximate to the inlet.

In use, a method of moving adhesive particulate to an adhesive melter includes filling an interior space of a supply hopper with an adhesive particulate. The method further includes entraining an amount of make-up gas within a gas space at least partially defined by a shroud within the interior space of the supply hopper. As such, the gas space is proximate to an inlet of a transfer pump to thereby increase an amount of make-up gas located around the adhesive particulate proximate to the inlet. Additionally, the method includes actuating the transfer pump to generate a vacuum at the inlet to actuate removal of the adhesive particulate from the supply hopper.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

DETAILED DESCRIPTION

Figure 1:
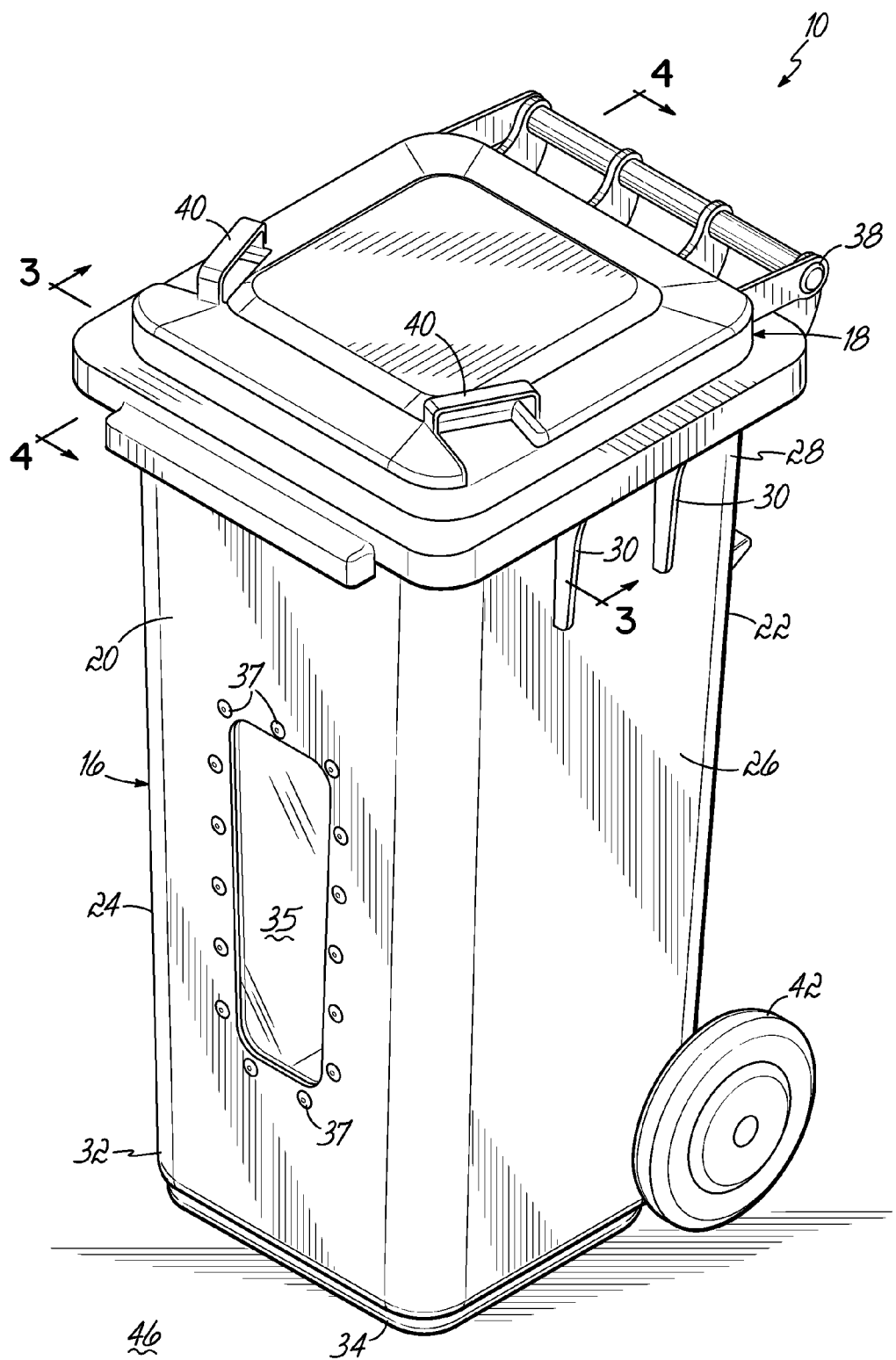
FIG. 1 is a front perspective view of an adhesive bin used to supply adhesive particulate to an adhesive melter of an adhesive dispensing system.

With reference to FIGS. 1-4, an exemplary embodiment of an adhesive bin 10 configured to store and move adhesive particulate, such as pellets and chips, to an adhesive melter 12 of an adhesive dispensing system is shown. The adhesive particulate may then be melted into liquid adhesive with the adhesive melter 12 and dispensed via an adhesive dispensing module 13. According to the exemplary embodiment, the adhesive particulate is in the form of adhesive pellets 14 (see FIG. 4). As used herein, the term "adhesive pellets" is not intended to be limiting as to any specific shape or size, so long as the adhesive pellets are suitable to be carried by a stream of forced air such as a vacuum-driven stream. For example, and without limitation, adhesive pellets may have regular shapes, irregular shapes, or any combination thereof. Moreover, any two pellets may have distinct shapes and/or dimensions and still be jointly and generally referred to as "adhesive pellets." Furthermore, the collective adhesive particulate stored within the adhesive bin 10 includes a plurality of gaps between individual pieces of adhesive particulate. Gas, such as ambient air, is "entrained" within each of the gaps around the individual pieces of adhesive particulate. As used herein, the term "entrained" refers to gas generally within and around the collective adhesive particulate stored within the adhesive bin 10. As such, "entrained" should not be limited to entrapping or sealing gas within the collective adhesive particulate or individual pieces of adhesive particulate. Rather, the term "entrained" refers to gas within the adhesive bin 10 that is at least partially surrounded by adhesive particulate.

The adhesive bin 10 includes a supply hopper 16 having a lid 18 movable between open and closed positions. The supply hopper 16 is formed from at least one sidewall. In the exemplary embodiment, the at least one sidewall includes a front sidewall 20 and an opposing rear sidewall 22. A pair of opposing lateral sidewalls 24, 26 each extend between the front and rear sidewalls 20, 22 such that the supply hopper 16 is generally rectangular in shape. Furthermore, an upper portion 28 of the supply hopper 16 includes a plurality of ribs 30 positioned on each of the front, rear, and lateral sidewalls 20, 22, 24, 26 for improving the rigidity of the upper portion 28. A lower portion 32 of the supply hopper 16 also includes a bottom 34 extending transversely between each of the front, rear, and lateral sidewalls 20, 22, 24, 26. In this respect, the sidewalls 20, 22, 24, 26 and bottom 34 collectively define an interior space 36 for receiving and storing adhesive particulate. According to the exemplary embodiment, the front sidewall 20 also includes a window 35 for viewing the interior space 36. The window 35 is connected to the front sidewall 20 via a plurality of window fasteners 37. For example, the window 35 is generally transparent; however, the window 35 may also be generally translucent for viewing the interior space 36 to see the level of adhesive particulate within the interior space 36 in accordance with the invention described herein.

The lid 18 covers an opening (not shown) into the interior space 36 when in the closed position. The opening (not shown) is generally square and defined by the upper portion 28 of the supply hopper 16 for receiving adhesive particulate from above the adhesive bin 10. The lid 18 pivots about a hinge 38 adjacent to the rear sidewall 22 for moving between open and closed positions. Furthermore, the lid 18 includes a pair of handles 40 for manipulating the lid 18 between open and closed positions.

The adhesive bin 10 also includes a pair of wheels 42 and a pair of support members 44 for supporting the supply hopper 16 on a floor 46. Each of the wheels 42 are positioned on ends of an axle 48 extending through the lower portion 32 of the supply hopper 16 generally parallel to the rear sidewall 22. The wheels 42 are generally positioned adjacent to the rear sidewall 22 and straddle the opposing lateral sidewalls 24, 26. Each support member 44 is positioned on the bottom 34 adjacent to the front sidewall 20 and one of the lateral sidewalls 24, 26. Thus, in the event that the adhesive bin 10 rests on the floor 46, the wheels 42 and the support members 44 provide four points of contact with the floor 46 for stability. In the event that the adhesive bin 10 needs to be moved along the floor 46, the adhesive bin 10 may pivot upward about the wheels 42 for lifting the support members 44 off of the floor 46 and rolling the adhesive bin 10 to another position. The particular structure and shape or profile formed by the adhesive bin 10 may be modified in other embodiments without departing from the scope of the invention.

The adhesive bin 10 further includes an adhesive transfer assembly 49 configured for moving the adhesive particulate from the interior space 36 to the adhesive melter 12. The adhesive transfer assembly 49 is generally mounted to a recessed portion 51 of the rear sidewall 22 with a plurality of fasteners 50. The recessed portion 51 tapers into the interior space 36 for defining an assembly volume 52 in which the adhesive transfer assembly 49 is generally positioned. A mount panel 53 is also connected to the rear sidewall 22 for providing a rigid location for mounting various connections and conduits. Although the mount panel 53 and recessed portion 51 are shown angled from a horizontal orientation and a vertical orientation, respectively, it will be understood that the mount panel 53 and recessed portion 51 may be oriented in different orientations in other embodiments without departing from the scope of the invention, including horizontal and vertical orientations. For example, in an alternative embodiment, the recessed portion 51 may be positioned substantially flush with the remainder of the rear sidewall 22. A gas source 54 for supplying a gas supply, such as shop air, is fluidly connected to a supply conduit 55 connected to the mount panel 53. The supply conduit 55 directs the gas supply to a manifold assembly 56. According to an exemplary embodiment, the gas supply first routes through a filter 58 of the manifold assembly 56 and then to the remaining portion of the adhesive transfer assembly 49 to diminish the likelihood of foreign particles damaging the components of the adhesive transfer assembly 49.

From the manifold assembly 56, the gas supply is directed by a controller 60 to a transfer pump 62, such as a pneumatic pump, and a vibrator 64, each of which is connected to the recessed portion 51 of the rear sidewall 22. A power cord 66 is connected to the mount panel 53 for electrically connecting to a power supply 68 of the controller 60. As such, the controller 60 operatively directs the gas supply through a coupling 70. The coupling 70 splits the gas supply into a first gas supply portion and a second gas supply portion. The first gas supply portion flows from the coupling 70 to a pump gas inlet 72 via a pump gas conduit 74 for operating the transfer pump 62. Meanwhile, the second gas supply portion flows from the coupling 70 to a vibrator gas inlet 76 via a vibrator gas conduit 78 for operating the vibrator 64. In this respect, the gas supply may simultaneously be used to operate the transfer pump 62 and the vibrator 64. According to an exemplary embodiment, the gas supply is pressurized at approximately 65 psi and adapted to provide at least approximately 21 cubic feet per minute (cfm) of gas. With respect to the exemplary transfer pump 62 and the exemplary vibrator 64, the transfer pump 62 uses approximately 12 cfm as a venturi pump for operation while the vibrator 64 uses the remaining gas supply for operation.

Figure 2:
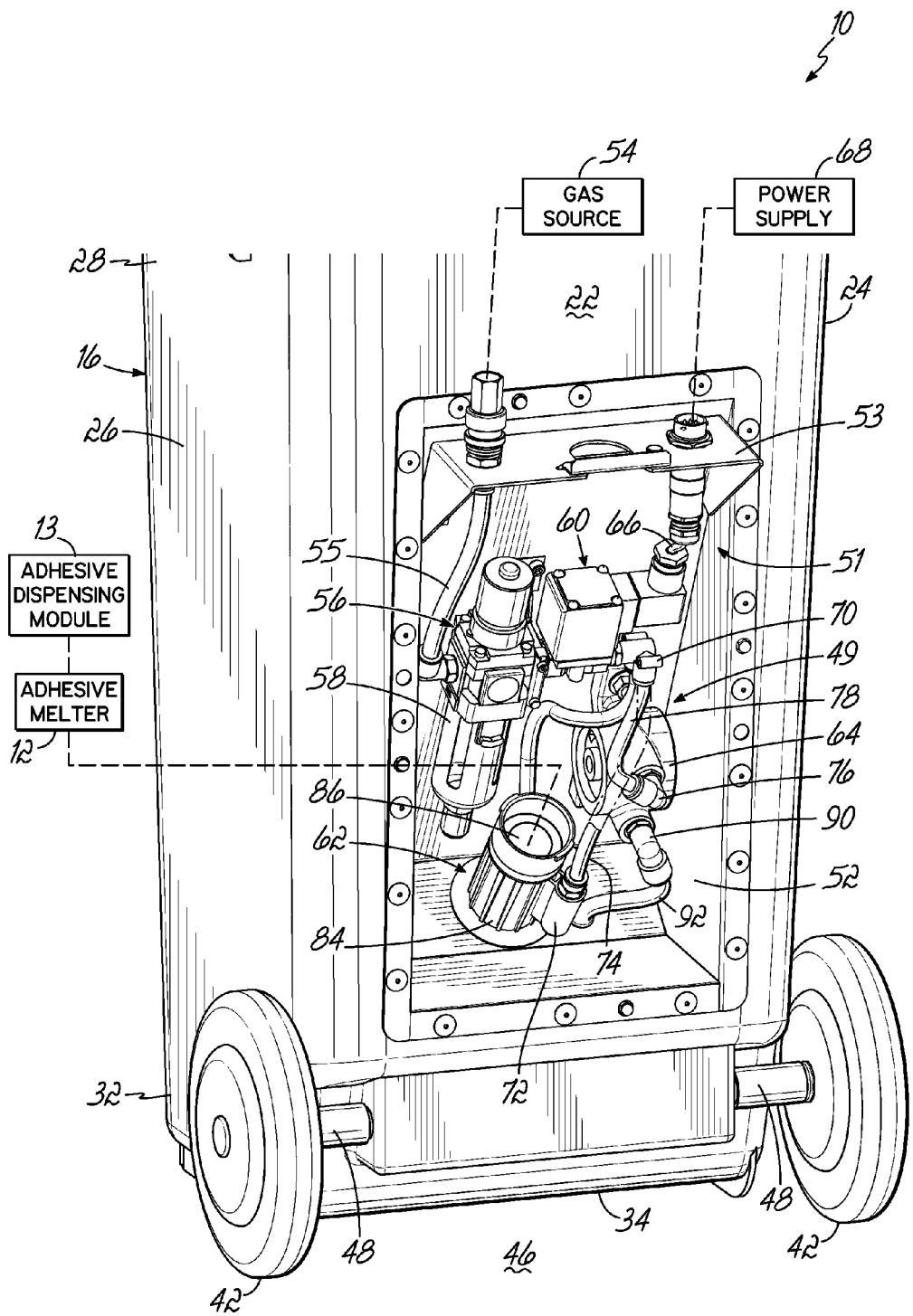
FIG. 2 is an enlarged rear perspective view of the adhesive bin of FIG. 1, showing details of a supply hopper, a transfer pump, and a vibrator.
Figure 3:
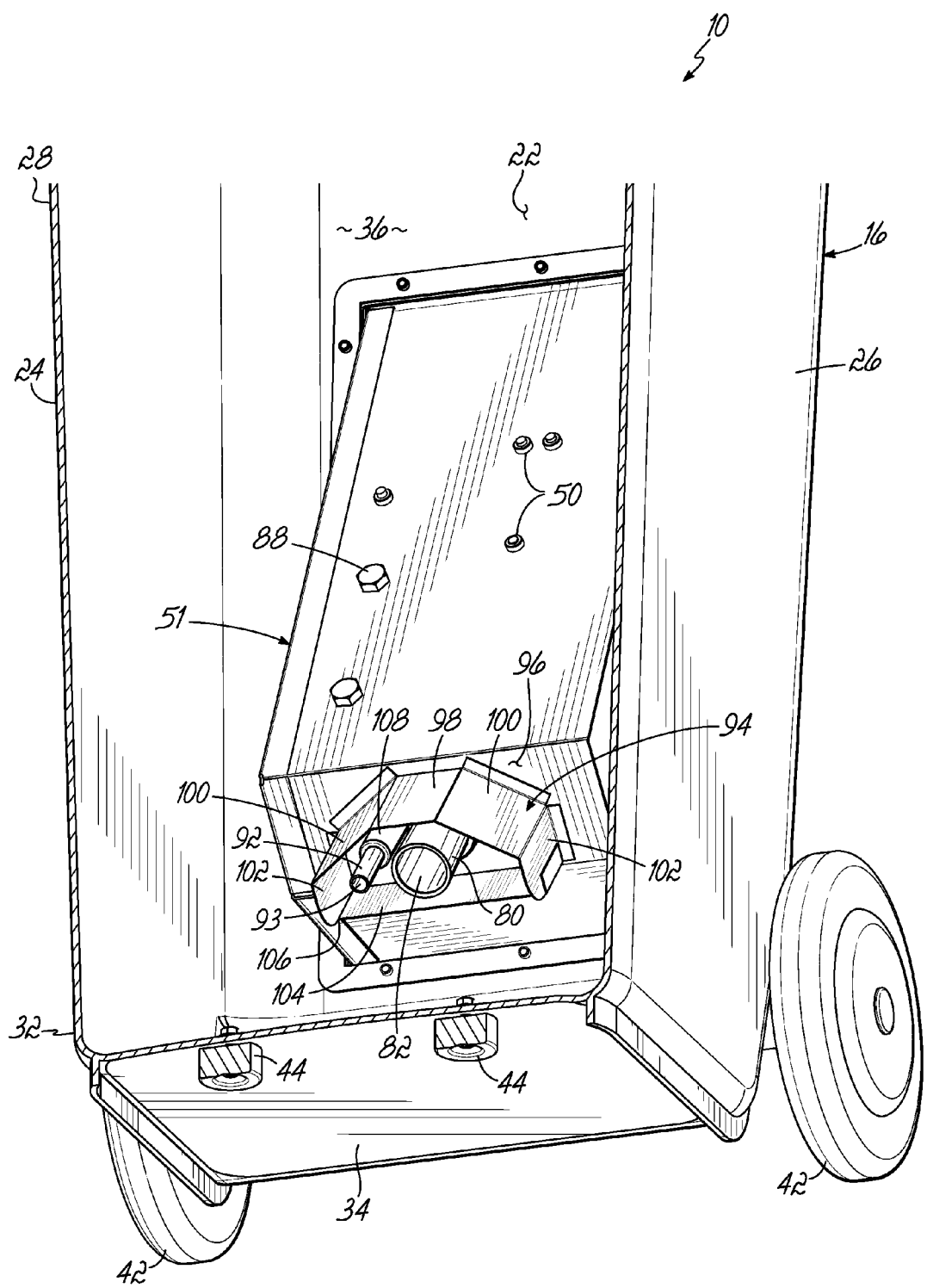
FIG. 3 is a perspective sectional view of the adhesive bin of FIG. 1 taken along section line 3-3 in FIG. 1.

With respect to FIG. 2 and FIG. 3, the transfer pump 62 includes an inner pump housing 80, which defines a pump inlet 82, and an outer pump housing 84, which defines a pump outlet 86. The inner and outer pump housings 80, 84 are connected to the recessed portion 51 of the rear sidewall 22. Specifically, the inner pump housing 80 extends from the recessed portion 51 to within the interior space 36, and the outer pump housing 84 extends outwardly from the recessed portion 51, away from the interior space 36. As such, the pump inlet 82 fluidly connects with the pump outlet 86. In turn, the pump outlet 86 is fluidly connected to the adhesive melter 12 for moving the adhesive particulate through the transfer pump 62 and to the adhesive melter 12.

The vibrator 64 is mounted to the recessed portion 51 via vibrator fasteners 88. The gas supply powers the vibrator 64 to operatively vibrate the recessed portion 51 for reducing compaction of the adhesive particulate within the interior space 36 adjacent to the pump inlet 82. According to an exemplary embodiment, the gas supply exhausting from a vibrator outlet 90 is directed into the interior space 36 via an exhaust gas conduit 92. Alternatively, the gas supply exhausting from the vibrator outlet 90 may be directed outside of the interior space 36. However, by routing the exhaust gas conduit 92 as shown in FIG. 2 and FIG. 3, the exhausting gas supply is effectively used as additional "make-up" gas for improving the efficiency of the transfer pump 62. As described herein, the term "make-up" gas generally refers to gas within the supply hopper 16 drawn into the pump inlet 82 from around the adhesive particulate during use. The make-up gas may be provided actively, such as pumping gas directly into the interior space 36, or passively, such as drawing entrained gas from gaps and other spaces around the adhesive particulate. According to an exemplary embodiment, the actively provided make-up gas and/or passively provided make-up gas are provided at least proximate to the pump inlet 82 for improving the efficiency of the transfer pump 62.

As described above, the exhausting gas supply from the vibrator 64 is routed proximate to the pump inlet 82 via the exhaust gas conduit 92. More particularly, the exhaust gas conduit 92 includes an exhaust conduit outlet 93 and extends through the recessed portion 51 of the rear sidewall 22 and into the interior space 36. According to an exemplary embodiment, the exhausting gas supply provides a preferred source of make-up gas because it is already sealed and filtered within the adhesive transfer assembly 49 as described above. However, it will be appreciated that other sources of make-up gas for exhausting proximate to the pump inlet 82 may also be used. In any case, the exhaust conduit outlet 93 is positioned generally proximate to the pump inlet 82.

Figure 4:
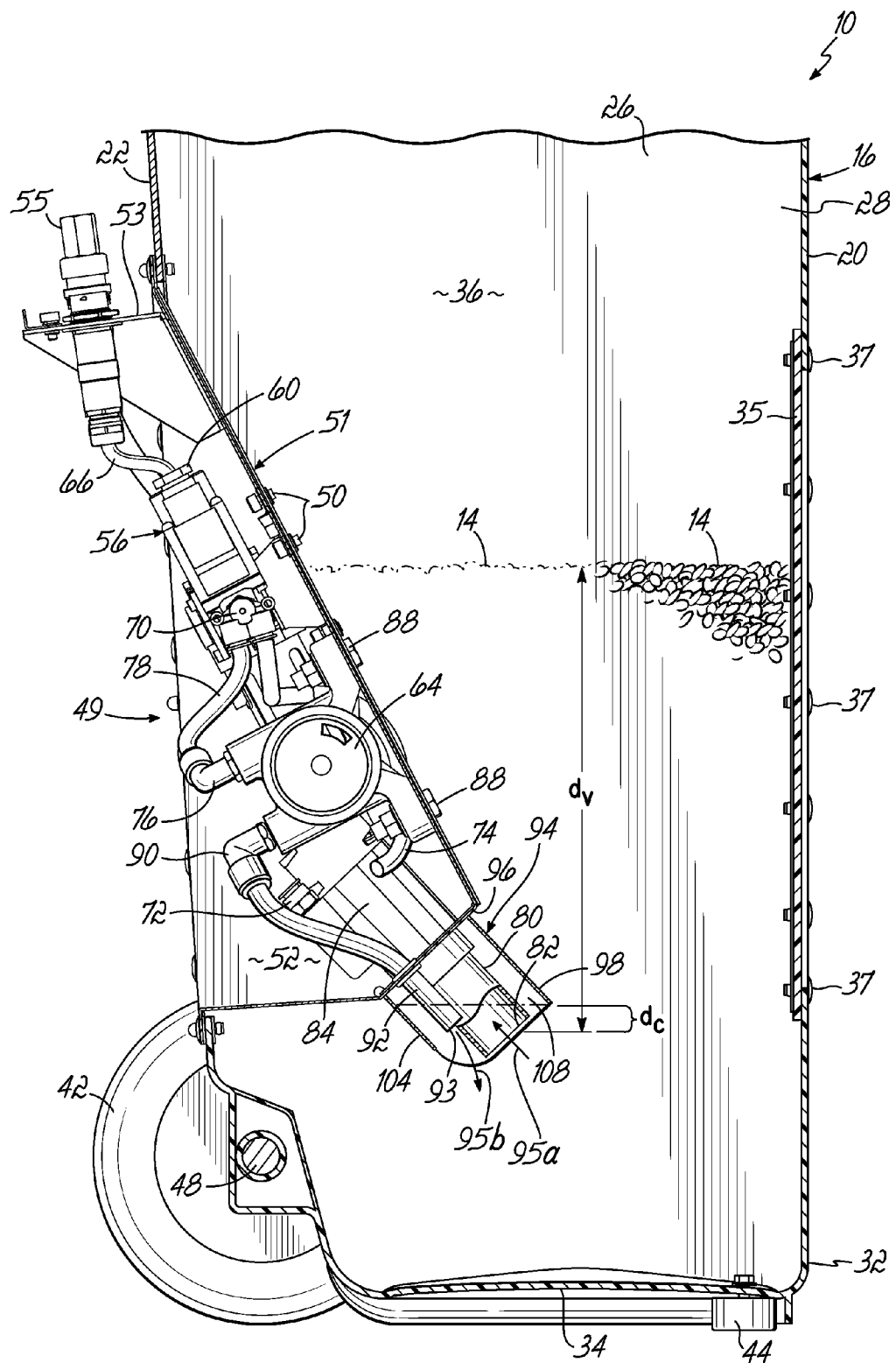
FIG. 4 is a cross-sectional view of the adhesive bin of FIG. 1 taken along section line 4-4 in FIG. 1.

With respect to FIG. 3 and FIG. 4, the gas supply actuates the transfer pump 62 to generate a vacuum at the pump inlet 82 for withdrawing gas through the pump inlet 82 as shown by arrow 95a. As the gas moves into the pump inlet 82, the gas actuates removal of the adhesive particulate by picking up and carrying adhesive particulate proximate to the pump inlet 82 into the transfer pump 62. However, without an amount of make-up gas being readily available proximate to the pump inlet 82, the efficiency of the transfer pump 62 is reduced. In this respect, actively providing make-up gas proximate to the pump inlet 82 as shown by arrow 95b improves the efficiency of the transfer pump 62.

The adhesive bin 10 also includes a shroud 94 for minimizing a depth of adhesive particulate located directly above the pump inlet 82. The shroud 94 is connected to an inner surface 96 of the recessed portion 51 and extends from the inner surface 96 into the interior space 36 so as to at least partially surround the inner pump housing 80. The shroud 94 includes a cover panel 98 vertically above the pump inlet 82. A medial panel 100 is connected on each side of the cover panel 98 for further widening the shroud 94 above the inner pump housing 80. Finally, a side panel 102 extends downward from each of the medial panels 100, and a bottom panel 104 extends between the pair of side panels 102. In this respect, the inner pump housing 80 is completely surrounded by the shroud 94 in the exemplary embodiment. Moreover, the bottom panel 104 also includes a recess 106 to help assist the adhesive particulate in filling up and covering the pump inlet 82 during use. However, it will be appreciated that the shroud 94 may be shaped or formed into various configurations. As such, the shroud 94 is not intended to be limited to the exemplary embodiment described herein. For example, the bottom panel 104 and/or other panels may be omitted in other embodiments of the adhesive bin 10.

As the adhesive particulate falls into the interior space 36 while being filled, the shroud 94 effectively deflects the adhesive particulate and prevents the adhesive particulate from stacking with a large depth directly above the inner pump housing 80. As described in more detail below, the large depth or variable depth of particulate adhesive that results when the shroud 94 is not present makes it more difficult for the pump inlet 82 to draw make-up air from the surrounding environment. In this respect, the shroud 94 and inner pump housing 80 collectively define a gas space 108 that may entrain additional gas proximate to the pump inlet 82. The entrained gas within the gas space 108 may then be used as make-up gas for improving the efficiency of the pump. In addition, the gas space 108 is sized above the pump inlet 82 so as to provide a consistent minimized depth $d_c$ of adhesive particulate in which the pump inlet 82 is positioned. The consistent minimized depth $d_c$ is generally defined as the depth of adhesive particulate from the top of the gas space 108 to the pump inlet 82. In contrast, the adhesive particulate generally has a variable depth $d_v$ above the pump inlet 82 that lowers as the transfer pump 62 moves the adhesive particulate from the supply hopper 16. The variable depth $d_v$ is generally defined as the depth of the adhesive particulate from an upper surface of the adhesive particulate to the pump inlet 82. Specifically, the variable depth $d_v$ is greater than the consistent minimized depth $d_c$ until the supply hopper 16 is substantially empty. At this point, the variable depth $d_v$ is generally equal to the consistent minimized depth $d_c$. According to an exemplary embodiment, the pump inlet 82 is not submerged at a depth greater than the consistent minimized depth $d_c$, because the shroud 94 and the gas space 108 are positioned vertically above the pump inlet 82. Thus, when the variable depth $d_v$ is greater than the consistent minimized depth $d_c$, the transfer pump 62 effectively withdraws make-up gas from the gas space 108 along the lesser depth $d_c$, and this further improves pumping efficiency.

Furthermore, the vibrator 64 is rigidly connected to the recessed portion 51, which is rigidly connected to the shroud 94. Thus, the vibrations created by the vibrator 64 also vibrate the shroud 94, which extends even further into the interior space 36 than the recessed portion 51. The vibration of the shroud 94 further loosens the adhesive particulate proximate to the pump inlet 82 and, in turn, provides for additional entrainment of make-up gas around the adhesive particulate for improving the efficiency of the transfer pump 62. Consequently, the position of the shroud 94, the vibrations of the vibrator 64, and the delivery of gas supply through the exhaust gas conduit 92 may collectively be used to increase entrained make-up gas available proximate to the pump inlet 82. This additional access to make-up air, in combination with the consistent minimized depth of particulate adhesive located above the pump inlet 82, enables a more efficient pumping operation.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination to provide advantageous and efficient operation of the transfer pump. For example, it will be appreciated that the shroud and the vibrator may be used exclusively or in combination for further improving the efficiency of the transfer pump. Thus, the invention is not intended to be limited to the combination of the vibrator and transfer pump as described herein. Additional advantages and modifications will readily appear to those skilled in the art. The invention in its broader aspects is therefore not limited to the specific details, representative apparatus and method and illustrative examples shown and described. Accordingly, departures may be from such details without departing from the scope of the general inventive concept.

What is claimed is:

1. An adhesive bin for storing and moving adhesive particulate to an adhesive melter, the adhesive bin comprising:
   a supply hopper having a sidewall and defining an interior space, said interior space configured to store adhesive particulate therein;
   a transfer pump having an inner pump housing defining an inlet, said transfer pump operatively connected to said supply hopper such that said inner pump housing extends into said interior space of said supply hopper, said transfer pump operable to generate a vacuum at said inlet to actuate removal of the adhesive particulate from said supply hopper; and
   a shroud extending into said interior space of said supply hopper, said shroud being spaced from and surrounding at least a portion of the circumference of said inner pump housing for maintaining a consistent depth of adhesive particulate located directly adjacent said inlet.

2. The adhesive bin of claim 1, wherein said inner pump housing and said shroud extend from said sidewall into said interior space.

3. The adhesive bin of claim 1, wherein said shroud includes a plurality of connected panels.

4. The adhesive bin of claim 1, wherein said shroud extends from said sidewall around an entirety of the circumference of said inner pump housing such that said shroud, said inner pump housing, and said sidewall collectively define an open space positioned within said interior space, and said open space is configured to entrain an amount of make-up gas proximate to said inlet.

5. The adhesive bin of claim 1, further comprising:
   a vibrator operatively connected to said shroud for vibrating said shroud and causing vibration of the adhesive particulate proximate to said inlet.

6. The adhesive bin of claim 5, wherein said vibrator and said shroud are connected to said sidewall, said vibrator configured to vibrate said sidewall to cause vibrations of said shroud.

7. The adhesive bin of claim 1, further comprising:
   a gas conduit configured to fluidly connect to a gas supply and defining a gas outlet, said gas outlet positioned proximate to said inlet and configured to provide an additional amount of make-up gas within said interior space of said supply hopper during generation of the vacuum with said transfer pump.

8. The adhesive bin of claim 7, further comprising:
   a vibrator configured to fluidly connect to the gas supply for actuating said vibrator to vibrate said shroud, said vibrator fluidly connected to said gas conduit for exhausting the gas supply to said gas outlet following actuation of said vibrator.

9. The adhesive bin of claim 8, wherein said shroud extends from said sidewall around an entirety of the circumference of said inner pump housing such that said shroud, inner pump housing, and sidewall collectively define an open space positioned within said interior space, said open space is configured to entrain an amount of make-up gas proximate to said inlet, and said gas conduit extends at least partially into said open space for providing additional amounts of make-up gas generally within said open space and proximate to said inlet.

10. An adhesive bin for storing and moving adhesive particulate to an adhesive melter, the adhesive bin comprising:
    a supply hopper having a sidewall and defining an interior space, said interior space configured to store adhesive particulate therein;
    a transfer pump having an inner pump housing defining an inlet, said transfer pump operatively connected to said supply hopper such that said inner pump housing extends into said interior space of said supply hopper, said transfer pump operable to generate a vacuum at said inlet to actuate removal of the adhesive particulate from said supply hopper;

a vibrator configured to fluidly connect to a gas supply for actuating said vibrator; and a gas conduit defining a gas outlet and fluidly connected to said vibrator for receiving the gas supply from said vibrator, said gas outlet positioned proximate to said inlet for exhausting the gas supply as make-up gas located around the adhesive particulate proximate to said inlet.

11. The adhesive bin of claim 1, wherein said shroud maintains a consistent minimized depth of adhesive particulate located directly above said inlet.

12. The adhesive bin of claim 1, wherein said shroud is above said inlet.

13. The adhesive bin of claim 10, further comprising a shroud extending into said interior space of said supply hopper, said shroud being spaced from and surrounding at least a portion of the circumference of said inner pump housing for maintaining a consistent depth of adhesive particulate located directly adjacent said inlet.

14. The adhesive bin of claim 13, wherein said shroud is above said inlet.

15. The adhesive bin of claim 13, wherein said inner pump housing and said shroud extend from said sidewall into said interior space.

16. The adhesive bin of claim 13, wherein said shroud includes a plurality of connected panels.

17. The adhesive bin of claim 13, wherein said shroud extends from said sidewall around an entirety of the circumference of said inner pump housing such that said shroud, said inner pump housing, and said sidewall collectively define an open space positioned within said interior space, and said open space is configured to entrain an amount of make-up gas proximate to said inlet.

18. The adhesive bin of claim 13, wherein said vibrator and said shroud are connected to said sidewall, said vibrator configured to vibrate said sidewall to cause vibrations of said shroud.

19. The adhesive bin of claim 13, wherein said shroud surrounds the entire circumference of said inner pump housing.

* * * * *